US012641098B2

(12) United States Patent
Cavallaro Corti et al.

(10) Patent No.: US 12,641,098 B2
(45) Date of Patent: May 26, 2026

(54) METHOD AND APPARATUS FOR DETECTING ANOMALIES OF AN INFRASTRUCTURE IN A NETWORK

(71) Applicant: Nozomi Networks Sagl, Mendrisio (CH)

(72) Inventors: Alessandro Cavallaro Corti, Varese (IT); Manlio Modugno, Albiolo (IT); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 133 days.

(21) Appl. No.: 17/681,832

(22) Filed: Feb. 27, 2022

(65) Prior Publication Data

US 2023/0275914 A1     Aug. 31, 2023

(51) Int. Cl.
| | |
|---|---|
| *H04L 29/06* | (2006.01) |
| *H04L 9/40* | (2022.01) |
| *H04L 41/0631* | (2022.01) |
| *H04L 43/18* | (2022.01) |
| *H04L 43/50* | (2022.01) |

(52) U.S. Cl.
CPC ...... *H04L 63/1425* (2013.01); *H04L 41/0631* (2013.01); *H04L 43/18* (2013.01); *H04L 43/50* (2013.01); *H04L 63/1408* (2013.01)

(58) Field of Classification Search
CPC ............. H04L 63/1425; H04L 63/1408; H04L 41/0631; H04L 43/18; H04L 43/50
See application file for complete search history.

(56) References Cited

U.S. PATENT DOCUMENTS

| | | | | |
|---|---|---|---|---|
| 4,281,315 | A * | 7/1981 | Bauer .................... | G06F 13/22 |
| | | | | 340/10.5 |
| 10,630,547 | B2 * | 4/2020 | Srinivas ................ | H04L 41/147 |
| 10,955,831 | B2 * | 3/2021 | Carcano ............ | G05B 19/4186 |
| 2002/0162010 | A1 * | 10/2002 | Allen .................. | G06F 11/2294 |
| | | | | 714/E11.173 |
| 2016/0134503 | A1 * | 5/2016 | Watson ................ | H04L 43/026 |
| | | | | 709/224 |
| 2016/0330673 | A1 * | 11/2016 | Vigoureux ............ | H04W 48/16 |
| 2020/0112584 | A1 * | 4/2020 | Schwartz ............ | H04L 63/1433 |
| 2020/0209837 | A1 * | 7/2020 | Carcano ................ | G06F 16/904 |
| 2020/0287927 | A1 | 9/2020 | Zadeh et al. | |
| 2020/0356379 | A1 * | 11/2020 | Gopisetti ................ | G06N 3/08 |

FOREIGN PATENT DOCUMENTS

EP            3674823 A1     7/2020

* cited by examiner

*Primary Examiner* — Farid Homayounmehr
*Assistant Examiner* — Judy Bazna
(74) *Attorney, Agent, or Firm* — Jason L DeFrancesco

(57) ABSTRACT

The present invention relates to a method and to an apparatus for detecting anomalies of an infrastructure in a network comprising analysing, through a network analyser (101) connected to the network, a data packet (PD) exchanged in the network, identifying an identified protocol and identified fields of said data packet (PD), extracting one or more allowed fields and one or more allowed protocols from a predefined devices knowledge database, comparing the allowed fields and the allowed protocols respectively with the identified fields and the identified protocol defining at least one critical state of the infrastructure when the identified fields differ from the allowed fields or when the identified protocol differ from the allowed protocols.

14 Claims, 2 Drawing Sheets

100

METHOD AND APPARATUS FOR DETECTING ANOMALIES OF AN INFRASTRUCTURE IN A NETWORK

FIELD OF INVENTION

The present invention relates to the field of security management of infrastructures, such as automation systems and industrial production systems. In particular, the present invention relates to a method for detecting anomalies of an infrastructure in a network.

In a further aspect, the present invention relates to a system for detecting anomalies of an infrastructure in a network.

BACKGROUND ART

Security products of known type detect malicious attacks and sometimes are also able to take action to prevent them. The majority of intrusion prevention systems, or Intrusion Detection System (IDS), utilize one of detection methods between signature-based, statistical anomaly-based, and stateful protocol analysis. Signature-based IDS monitors packets in the Network and compares with pre-configured and pre-determined attack patterns known as signatures. An IDS which is anomaly-based will monitor network traffic and compare it against an established baseline. The baseline will identify what is normal for that network. Finally, the stateful protocol analysis detection identifies deviations of protocol states by comparing observed events with pre-determined profiles of generally accepted definitions of benign activity.

Detecting anomalous behaviours in a network of computers is a complex but fundamental task for an IDS. With regards to Operational Technology (OT) networks, useful anomalies to be detected are when a device starts a communication with an unexpected protocol, which can be a symptom that the device under monitoring has been contacted by a malicious node inside the network that is performing a network scan or maybe just a configuration error. Moreover, useful anomalies to be detected are when a new function code is used inside a communication with a legit protocol. In this regard, a function code is an operation that an OT device support, wherein common operations are "read variable", "write variable", "start device" "stop device" or "update firmware". Some of these operations can be disruptive for the device itself and as a consequence for the process that the device serves. An unexpected function code sent to a device can be a symptom of an attacker trying to disrupt the device, a reconnaissance attempt or a misconfiguration.

An IDS with the ability to observe network traffic and decode protocols could implement a simple anomaly detection method with a two-phase approach, such as the approach described in the U.S. Pat. No. 10,955,831 B2.

In a learning phase the IDS will memorize all the protocols used between nodes and for every protocol will memorize all the function codes. Thus, with the learning phase all the memorized items will be marked as "learned" and interpreted as good, i.e., not considered anomalies. In a protecting phase the IDS will match any new items in the network (new communication between nodes or new function code in a communication) against the set of learned items and will raise an alert when a new item is not found which was not "learned", i.e., considered anomalies.

The aforementioned approach can be adapted to any kind of networks and does not require any previous knowledge.

However, it is not always clear when to switch from the "learning" phase to the "protecting" phase, the switch being often a user choice wherein a long learning phase will secure more data to be used in the protecting phase with an expensive procedure, while a short learning phase will be less expensive but with a risk to raise false positives alerts.

A further problem with the two-phase approach relates to possibility to learn malicious behavior during the "learning" phase, which will never raise an anomaly alert in the "protecting" phase. Therefore, if the network to be learned is completely in a secure environment, i.e., under user control with good items exchanged, the method will work in a correct way otherwise malicious item can be learned as safe items.

Moreover, during the "learning" phase no behavioral alerts are raised, therefore exposing the network to be protected to attacks.

Nevertheless, the biggest problem with a method using the aforementioned approach is that the method is not able to scale when a network is very dynamic and of a big dimension. In particular, it is very hard to validate the output of the learning phase and to recognize if the learned network does not contain any malicious activity learned by mistake.

It would therefore be desirable to have a method capable of detecting anomalies with the ability to scale when a network is very dynamic and of a big dimension.

Likewise, it would be desirable to have a system capable of detecting anomalies with the ability to scale when a network is very dynamic and of a big dimension.

BRIEF DESCRIPTION OF THE INVENTION

The object of the present invention is to provide a method for detecting anomalies of an infrastructure in a network. In particular, it would be desirable to provide a method for detecting anomalies of an infrastructure in a network able to recognize any malicious activity in a dynamic and scalable way.

According to the present invention is described, therefore, a method for detecting anomalies of an infrastructure in a network.

The method comprises:

analysing, through a network analyser connected to the network, a data packet exchanged in the network;

identifying, through the network analyser, the network protocol and all the fields for the analysed data packet defining an identified protocol and identified fields of the data packet;

extracting, through computerized data processing means, identification fields from the identified fields to identify a device of the infrastructure in the network;

matching, through the computerized data processing means, the identified device with a plurality of predefined standard devices in a predefined devices knowledge database to recognise a matching device;

retrieving, through the computerized data processing means, one or more allowed fields and one or more allowed protocols of the matching device from the predefined devices knowledge database;

comparing, through the computerized data processing means, the allowed fields and the allowed protocols respectively with the identified fields and the identified protocol defining at least one critical state of the infrastructure when the identified fields differ from the allowed fields or when the identified protocol differ from the allowed protocols;

signalling, by means of the computerized data processing means, an anomaly of the infrastructure when at least one of the critical states is identified.

In a further embodiment, in extracting the identification fields comprise the vendor and product name to identify the device of the infrastructure in the network.

In a further embodiment, in extracting the identified fields comprise the function codes of the identified protocol.

In a further embodiment, in matching the matching device is recognized by matching the vendor and product name of the identified device.

In a further embodiment, in retrieving the allowed fields comprise allowed function codes for each allowed protocol.

In a further embodiment, the method comprises storing, in a volatile storage, the identified protocol and the identified fields of the data packet.

In a further embodiment, the method comprises storing, in a volatile storage, the identification fields relating to the identity of the device of the infrastructure in the network.

In a further embodiment, the method comprises storing, in a volatile storage, the allowed fields and the allowed protocols of the matching device.

In a further embodiment, the method is iterated for all the data packet exchanged in the network.

The aforementioned object is further achieved by an apparatus for detecting anomalies of an infrastructure in a network.

The apparatus comprises a network analyser to be connected to a network, a computerized data processing means operatively connected to the network analyser and a predefined devices knowledge database operatively connected to the computerized data processing means, wherein the network analyser in use analyses a data packet exchanged in the network and identifies the network protocol and all the fields for the analysed data packet defining an identified protocol and identified fields of the data packet, wherein the computerized data processing means in use extracts identification fields from the identified fields to identify a device of the infrastructure in the network, wherein the computerized data processing means in use matches the identified device with a plurality of predefined standard devices in the predefined devices knowledge database to recognise a matching device, wherein the computerized data processing means in use retrieves one or more allowed fields and one or more allowed protocols of the matching device from the predefined devices knowledge database, wherein the computerized data processing means in use compares the allowed fields and the allowed protocols respectively with the identified fields and the identified protocol defining at least one critical state of the infrastructure when the identified fields differ from the allowed fields or when the identified protocol differ from the allowed protocols, and wherein the computerized data processing means in use signals an anomaly of the infrastructure when at least one of the critical states is identified.

In a further embodiment, the apparatus comprises a remote update system operatively connected to the predefined devices knowledge database, and wherein in use the remote update system updates the predefined devices knowledge database.

In a further embodiment, the remote update system is a cloud system.

In a further embodiment, the apparatus comprises a plurality of network analysers each of which to be connected to a respective network, a plurality of computerized data processing means each of which operatively connected to a respective of the network analysers and a plurality of predefined devices knowledge databases each of which operatively connected to a respective of the computerized data processing means, wherein the remote update system is operatively connected to the predefined devices knowledge databases, and wherein in use the remote update system updates the predefined devices knowledge databases.

DESCRIPTION OF THE FIGURES

These and further features and advantages of the present invention will become apparent from the disclosure of the preferred embodiment, illustrated by way of a non-limiting example in the accompanying figures, wherein.

DETAILED DESCRIPTION OF THE INVENTION

The present invention relates to a method and apparatus for detecting anomalies in an infrastructure, in particular a physical infrastructure.

The method according to the present invention finds a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

Figure 1:
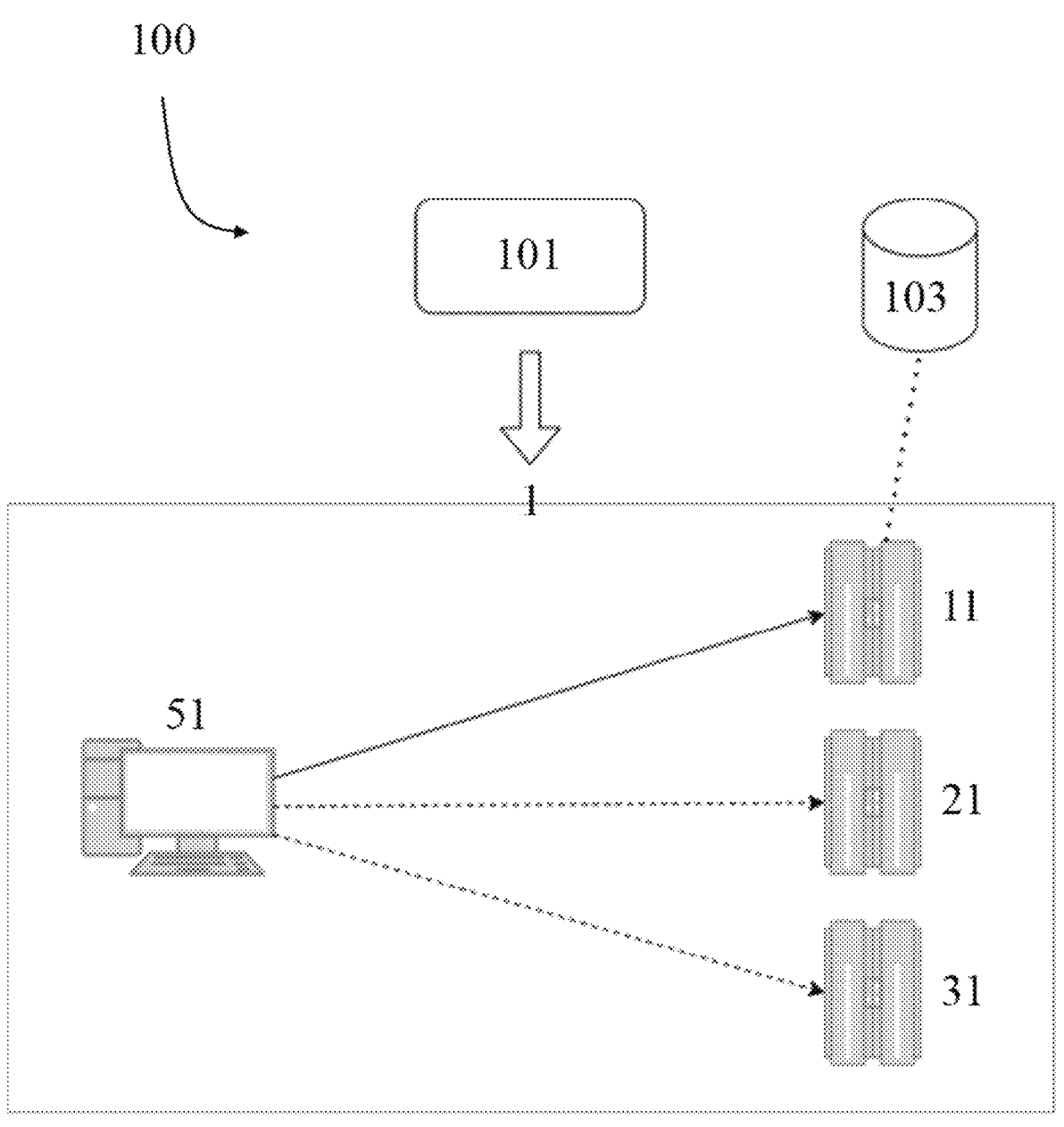
FIG. 1 shows an infrastructure operatively connected to the apparatus according to the present invention.

The following description will refer to the method and the apparatus according to the present invention when interacting with a physical infrastructure exemplified for convenience of description, but any type of physical infrastructure may be equally employed. In particular, FIG. 1 illustrates an infrastructure 1 defining part of the physical architecture of an industrial system in a network. By way of example, such physical architecture is defined by some elements, i.e. physical components, connected to each other and sufficient to allow the invention to be fully described. Such elements comprise three logic controllers 11, 21, 31 (PLC devices) and the computer device 51 connected by means of a telecommunication system (partially exemplified with the solid and dashed lines connecting each component in FIG. 1) which exploits network connections of the known type by means of network communication protocols also of the known type and which therefore will not be described further.

According to further embodiments, not shown, further components can be part of the infrastructure.

The term "data packet" relates, in the present invention, to each finite and distinct sequence of data transmitted by the telecommunication system. Preferably, these data are in digital format and defined by a sequence of bits. In particular, according to the present invention each individual data packet comprises a plurality of Protocol Data Units (PDU), one for each architectural layer in which it is generated. Depending on the type of communication protocol and the transmission system used in the telecommunication system, each PDU will be different but, in any case, it comprises at least one header and the data body to be transmitted. The header contains all the information necessary for transmission, including the transmitter address and the receiver address. Each data packet PD provides identifying mechanisms that uniquely distinguish it from the other packets of the data stream exchanged from a source device to a recipient device.

The monitoring and detecting of possible anomalies during the operation of the infrastructure 1 are obtained by means of an anomaly detection apparatus 100, according to the present invention. Such apparatus 100 is schematized with a block representation in FIGS. 1 and 2. The aforementioned apparatus 100 is preferably of the passive type, i.e. it monitors the entire infrastructure 1 without being actively connected to the same. In the described embodiment, the apparatus 100 is arranged in the telecommunication system between the computer device 51 and logic controllers 11, 21, 31. According to further embodiments, not shown, the anomaly detection apparatus according to the present invention can be connected to a suitable mirroring port of a router or a switch connecting the supervision unit to the logic controllers.

Figure 2:
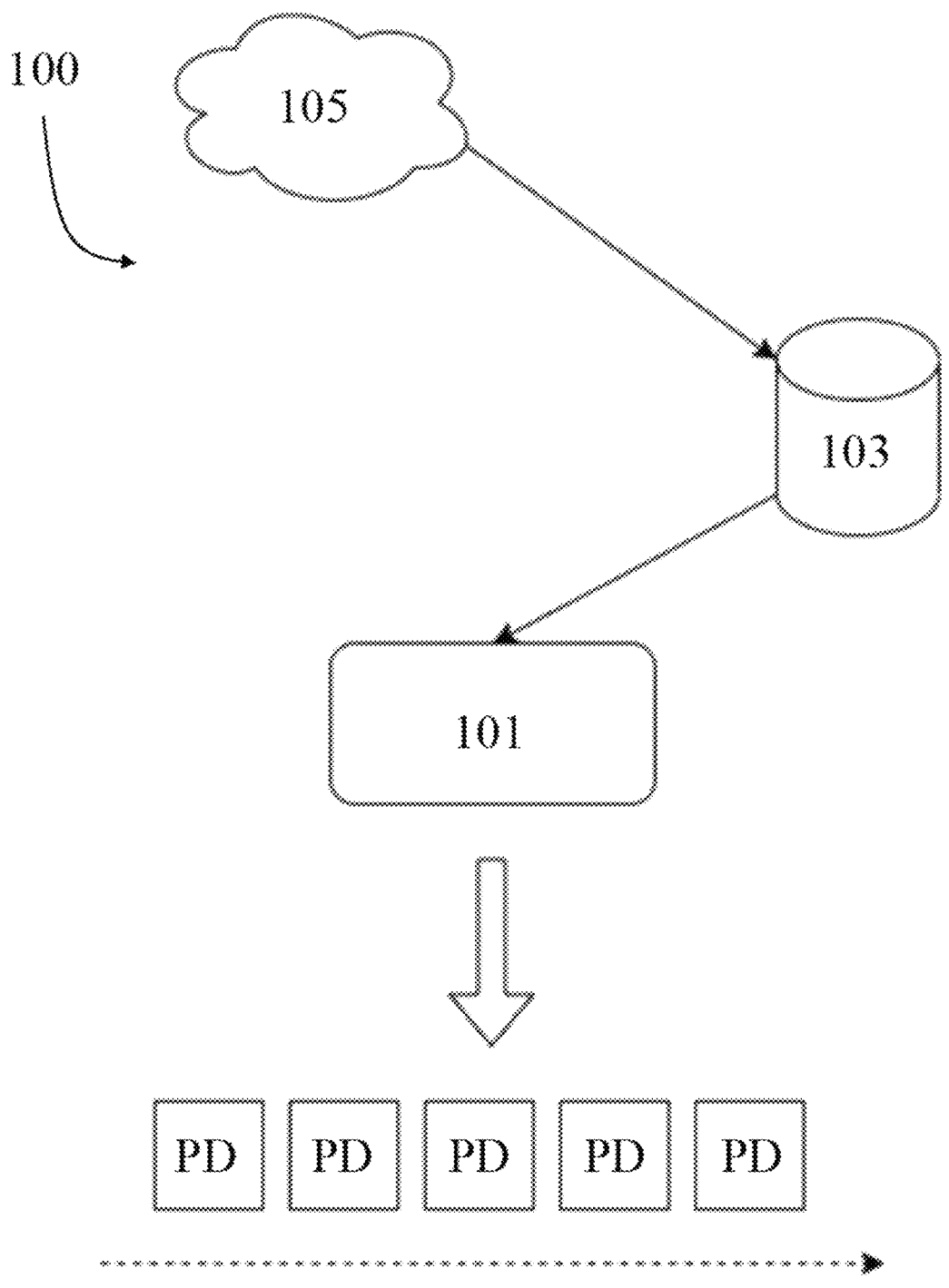
FIG. 2 shows the apparatus of FIG. 1 provided with a remote update system.

The apparatus 100 comprises multiple components, which are also shown schematically in blocks in FIGS. 1 and 2, suitable for interacting with the infrastructure 1 and detecting any possible anomalies thereof. In particular, the apparatus 100 according to the present invention comprises a network analyser 101 to be connected to a network (not shown), such as a telecommunication system, a computerized data processing means (not shown) operatively connected to the aforementioned network analyser 101, and a predefined devices knowledge database 103 operatively connected to the computerized data processing means, as illustrated in FIGS. 1 and 2. In particular, the combination of the network analyser 101 and of the predefined devices knowledge database 103 can be defined by an intrusion detection system (IDS). The combination of the network analyser 101 and of the predefined devices knowledge database 103, or any intrusion detection system, has therefore the ability to sniff and decode traffic, to decode a wide range of protocols. Moreover, it is possible to keep an internal representation of the observed network and reacts to events such as a new communication between nodes or a new function code used in an existing communication.

According to the present invention, the predefined devices knowledge database 103 comprises a plurality of items preferably provided with a match key to identify a single device, the allowed protocols for said device and the allowed function_codes for said device. The aforementioned database that contains the items, is therefore periodically queried by the IDS to retrieve the contents needed for anomaly detection. The match key is used to associate an item of the predefined devices knowledge database 103 with a device detected on the network. The allowed protocols comprise the list of the protocols that the device is allowed to talk. As opposite as a general-purpose computer, an OT device has only a finite list of supported protocols that in general is short. Moreover, the allowed function_codes comprise a list of allowed function codes that can be used by each allowed protocol. An example item of the predefined devices knowledge database 103 for a PLC device is herewith described:

```
{
  "match": {
    "vendor": "Schneider Electric",
    "product_name": "M340"
  },
  "protocols": {
    "tcp/502": "modbus",
    "tcp/80": "http",
    ... // more protocols
  },
  "function_codes": {
    "modbus": [
      "90", // specific Unity function code
      "1", // read coils
      "2", // read discrete inputs
      "3", // read holding registers
      .... // more function codes
    ]
  }
}
```

As illustrated, the apparatus 100 according to the preferred embodiment comprises a remote update system 105 operatively connected to the predefined devices knowledge database 103. In particular, the remote update system 105 is able in use to update the predefined devices knowledge database 103. In particular, the remote update system 105 is a cloud system, but different technologies can be used. In this way, it is possible to periodically update the predefined devices knowledge database 103 from a Cloud Service or by a different kind of services. The Cloud Service is the component that provides the items of the predefined devices knowledge database 103 to the IDS. For an effective anomaly detection, the predefined devices knowledge database 103 contents need to be constantly updated to be able to detect new devices or update existing devices when their potential behavior change, for example, after a firmware update issued by the vendor that adds or alter functionality.

According to different embodiments, the apparatus according to the present invention can be devoid of such remote update system.

The apparatus 100 according to the present invention may also comprise volatile storage (not shown), or storage means of permanent type, operatively connected to the computerized data processing means.

The network analyser 101 which is part of the apparatus 100, is connected to the infrastructure 1 and passively interacts with the telecommunication system. The aforementioned network analyser 101 is able to analyse each of the data packets PD exchanged in the telecommunication system and to identify the network protocol for each of the data packets and at least one field of the protocol. In particular, in the present embodiment, the network analyser 101 is able to intercept each data packet PD exchanged between the computer device 51 and the logic controllers 11, 21, 31 connected thereto.

According to different embodiments, herewith not described, the individual logic controllers can be mutually connected in the same telecommunication system, the network analyser being therefore able to also intercept each data packet exchanged between the same controllers.

The operation of the anomaly detection apparatus 100 according to the anomaly detection method according to the present invention, during the normal operation of the infrastructure 1 to which it is connected, is below described. All the components of the infrastructure 1, according to the present invention, are network connected using the Modbus communication protocol. In particular, the communication via the Modbus protocol is performed by exchanging data packets PD over TCP/IP from the various PLCs 11, 21, 31 to the computer device 51 vice versa.

According to different embodiments, different communication protocols can also be used.

The anomaly detection method, according to the present invention, therefore, comprises analysing, by means of the network analyser 101 connected to the network, a data packet PD exchanged in the aforesaid network of the apparatus 1. Preferably, analysing comprises the analysis of all data packets exchanged in the network.

The network analyser 101 thus enables to carry out the passive interception activity of the entire infrastructure network 1. For each of the analysed data packets PD, the network analyser 101 in use analyses a data packet PD exchanged in the network and identifies the network protocol and all the fields for the analysed data packet defining an identified protocol and identified fields of the data packet. In particular, in the extracting the identification fields comprise the vendor and product name to identify the device of the infrastructure in the network, therefore the IDS 101 is able to extract vendor and product_name information from specific protocols and, when a device is recognized, the item in the predefined devices knowledge database 103 is associated with it. Moreover, in the extracting the identified fields comprise the function codes of the identified protocol.

The network analyser 101 then analyses each data packet PD exchanged via the telecommunication system, i.e. the network of the apparatus 1. The analysis of the data packets PD is carried out in push mode, that is, it is carried out whenever a communication occurs regardless of the time intervals between the same communications.

The anomaly detection apparatus 100 is further provided with suitable computerized data processing means, operatively connected to the network analyser 101. Such data processing means enable processing of the data intercepted in the telecommunication system by the network analyser 101. Therefore, the computerized data processing means in use extracts identification fields from the identified fields to identify a device of the infrastructure 1 in the network. As in FIG. 1, a PLC 11 that support standard Modbus is identified on the network by the network analyser 101 after a communication between the computer device 51 and the PLC 11 itself, as depicted with the solid arrow.

The method further comprises matching, through the computerized data processing means, the identified device with a plurality of predefined standard devices in a predefined devices knowledge database 103 to recognise a matching device. Preferably, in the matching the matching device is recognized by matching the vendor and product name of the identified device. The specific item is associated to the identified PLC 11, the list of allowed protocols contains Modbus and the list of allowed function codes contains the standard Modbus function codes. In particular, the IDS 103 will match the allowed protocols list against what is found in traffic to detect items that are not allowed and raise an alert when a violation is found. Moreover, the IDS 103 will match the allowed function codes list against what is found in traffic to detect items that are not allowed and raise an alert when a violation is found.

The method further comprises retrieving, through the computerized data processing means, one or more allowed fields and one or more allowed protocols of the matching device from the predefined devices knowledge database 103. Moreover, in the retrieving the allowed fields comprise allowed function codes for each allowed protocol.

In particular, the PLC 11 is queried with function code 1 with the Modbus protocol by the computer device 51 in the network and the IDS 101 match the operation against the corresponding item in the predefined devices knowledge database 103.

The method further comprises comparing, through the computerized data processing means, the allowed fields and the allowed protocols respectively with the identified fields and the identified protocol defining at least one critical state of the infrastructure 1 when the identified fields differ from the allowed fields or when the identified protocol differ from the allowed protocols.

It is supposed that function code 1 with the Modbus protocol is allowable for PLC 11, that is in the corresponding item of the predefined devices knowledge database 103 is present the Modbus protocol and the function code 1 as well as allowable protocol and field.

Therefore, the method further comprises signalling, by means of the computerized data processing means, an anomaly of the infrastructure 1 when at least one of the critical states is identified. Taking into account the above example, no alert or signalling is raised as the protocol and function code are allowed.

Preferably, the method is iterated for all the data packet exchanged in the network. Therefore, it is supposed that a new packet data PD is analysed through a network analyser 101, identifying and extracting that PLC 11 is queried again but with function code 90 with the Modbus protocol.

It is supposed that function code 90 with the Modbus protocol is not allowable for PLC 11 that is in the corresponding item of the predefined devices knowledge database 103 is not present the Modbus protocol and the function code 90 as well as allowable protocol and field together.

Therefore, the method further comprises signalling, by means of the computerized data processing means, an anomaly of the infrastructure 1 when at least one of the critical states is identified. Taking into account the above example, an alert or signals is raised as the protocol and function code are not allowed together for the item corresponding to the PLC 11.

According to a further embodiment, the method comprises storing, in a volatile storage (not shown), the identified protocol and the identified fields of the data packet.

Moreover, according to a further embodiment, the method comprises storing, in a volatile storage (not shown), the identification fields relating to the identity of the device of the infrastructure in the network.

Finally, according to a further embodiment, the method comprises storing, in a volatile storage (not shown), the allowed fields and the allowed protocols of the matching device.

In a further embodiment, not shown, the apparatus comprises a plurality of network analysers each of which to be connected to a respective network, a plurality of computerized data processing means each of which operatively connected to a respective of the network analysers and a plurality of predefined devices knowledge databases each of which operatively connected to a respective of the computerized data processing means. The remote update system is operatively connected to the predefined devices knowledge databases and, in use, the remote update system updates the predefined devices knowledge databases.

With the method and the apparatus according to the present invention no learning phase or protecting phase switch is needed, since as soon as the IDS detects a device vendor and product name from traffic an item from the predefined devices knowledge database is associated with the corresponding device and, if a deviation from the predefined devices knowledge database item is found, an alert is raised with some contextual information attached like the protocol, the function code, the source and destination nodes involved in the communication. This approach has also a high degree of precision in many cases.

The present invention therefore provides a method and an apparatus for detecting anomalies of an infrastructure in a network, recognizing any malicious activity in a dynamic and scalable way. In particular, no learning phase is needed since the knowledge acquired during a hypothetical learning phase is compensated by a prebuilt base of contents through the predefined devices knowledge database and all items, allowed protocols and allowed fields herewith contained. Moreover, alerts can be raised with a high level of precision and confidence, the prebuilt predefined devices knowledge database enables the IDS to find small discrepancies in behavior that are easy to miss with a learning/protecting approach.

The invention claimed is:

1. A method for detecting anomalies of an infrastructure in a network comprising:

analysing, through a network analyser (101) connected to said network, a single data packet (PD) exchanged in said network;

identifying, by analysing through said network analyser (101) only said data packet (PD) without needing aggregation from multiple data packets, the network protocol and all the fields for said analysed data packet (PD) defining an identified protocol and identified fields of said data packet (PD);

extracting, through computerized data processing means (102), identification fields from said identified fields to identify a device of said infrastructure in said network;

matching, through said computerized data processing means (102), said identified device with a plurality of predefined standard devices in a predefined devices knowledge database to recognise a matching device;

retrieving, through said computerized data processing means (102), one or more allowed fields and one or more allowed protocols of said matching device from said predefined devices knowledge database;

comparing, through said computerized data processing means (102), said allowed fields and said allowed protocols respectively with said identified fields and said identified protocol as directly obtained by said identification through the network analyser and defining at least one critical state of said infrastructure when said identified fields differ from said allowed fields or when said identified protocol differ from said allowed protocols;

signalling, by means of said computerized data processing means, an anomaly of said infrastructure when at least one of said critical states is identified;

wherein the analysis and the resulting action are performed in a real-time push mode by analysing a single data packet to provide instantaneous assessment and bypass the need of aggregation of multiple data packets or learning phase.

2. The method for detecting anomalies of an infrastructure in a network according to claim 1, wherein in said extracting said identification fields comprise the vendor and product name to identity said device of said infrastructure in said network.

3. The method for detecting anomalies of an infrastructure in a network according to claim 1, wherein in said extracting said identified fields comprise the function codes of said identified protocol.

4. The method for detecting anomalies of an infrastructure in a network according to claim 1, wherein in said matching said matching device is recognized by matching the vendor and product name of said identified device.

5. The method for detecting anomalies of an infrastructure in a network according to claim 1, wherein in said retrieving said allowed fields comprise allowed function codes for each allowed protocol.

6. The method for detecting anomalies of an infrastructure in a network according to claim 1, wherein said method comprises storing, in a volatile storage (103), said identified protocol and said identified fields of said data packet (PD).

7. The method for detecting anomalies of an infrastructure in a network according to claim 1, wherein said method comprises storing, in a volatile storage (103), said identification fields relating to the identity of said device of said infrastructure in said network.

8. The method for detecting anomalies of an infrastructure in a network according to claim 1, wherein said method comprises storing, in a volatile storage (103), said allowed fields and said allowed protocols of said matching device.

9. The method for detecting anomalies of an infrastructure in a network according to claim 1, wherein said method is iterated for all said data packet (PD) exchanged in said network.

10. The method for detecting anomalies of an infrastructure in a network according to claim 1, wherein said method comprises periodically updating, through a remote database system, said predefined devices knowledge database.

11. An apparatus for detecting anomalies of an infrastructure in a network comprising:

a network analyser (101) to be connected to a network, a computerized data processing means (102) operatively connected to said network analyser (101) and a predefined devices knowledge database operatively connected to said computerized data processing means, wherein said network analyser (101) in use analyses a data packet (PD)

exchanged in said network and identifies the network protocol and all the fields for said analysed data packet (PD) defining an identified protocol and identified fields of said data packet (PD), said network analyser (101) being configured to identify said network protocol and said fields by analysing only said data packet (PD) without aggregating information from multiple data packets, wherein said computerized data processing means (102) in use extracts identification fields from said identified fields to identify a device of said infrastructure in said network, wherein said computerized data processing means (102) in use matches said identified device with a plurality of predefined standard devices in said predefined devices knowledge database to recognise a matching device, wherein said computerized data processing means (102) in use retrieves one or more allowed fields and one or more allowed protocols of said matching device from said predefined devices knowledge database, wherein said computerized data processing means (102) in use compares said allowed fields and said allowed protocols respectively with said identified fields and said identified protocol as directly obtained by said identification through the network analyser defining at least one critical state of said infrastructure when said identified fields differ from said allowed fields or when said identified protocol differs from said allowed protocols, and wherein said computerized data processing means (102) in use signals an anomaly of said infrastructure when at least one of said critical states is identified;

wherein said computerized data processing means (102) in use wherein the analysis and the resulting action are performed in a real-time push mode by analysing a single data packet to provide instantaneous assessment and bypass the need of aggregation of multiple data packets or learning phase.

12. The apparatus for detecting anomalies of an infrastructure in a network according to claim 11, wherein said apparatus comprises a remote update system operatively connected to said predefined devices knowledge database, and wherein in use said remote update system updates said predefined devices knowledge database.

13. The apparatus for detecting anomalies of an infrastructure in a network according to claim 12, wherein said remote update system is a cloud system.

14. The apparatus for detecting anomalies of an infrastructure in a network according to claim 12, wherein the apparatus comprises a plurality of network analysers (101) each of which to be connected to a respective network, a plurality of computerized data processing means (102) each of which operatively connected to a respective of said network analysers (101) and a plurality of predefined devices knowledge databases each of which operatively connected to a respective of said computerized data processing means, wherein said remote update system is operatively connected to said predefined devices knowledge databases, and wherein in use said remote update system updates said predefined devices knowledge databases.

* * * * *